US012791067B2

(12) United States Patent
Kim

(10) Patent No.: US 12,791,067 B2
(45) Date of Patent: Nov. 10, 2026

(54) BRAKE PISTON AND MANUFACTURING METHOD THEREOF

(71) Applicant: HL MANDO CORPORATION, Pyeongtaek-si (KR)

(72) Inventor: Chuljoong Kim, Suwon-si (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 330 days.

(21) Appl. No.: 18/522,898

(22) Filed: Nov. 29, 2023

(65) Prior Publication Data

US 2024/0426355 A1 Dec. 26, 2024

(30) Foreign Application Priority Data

Jun. 22, 2023 (KR) ........................ 10-2023-0080591

(51) Int. Cl.
*F16D 55/226* (2006.01)
*F16D 65/18* (2006.01)

(52) U.S. Cl.
CPC .... *F16D 55/226* (2013.01); *F16D 2200/0004* (2013.01); *F16D 2250/0076* (2013.01)

(58) Field of Classification Search
CPC .... F16D 55/226; F16D 65/18; F16D 2125/06; F16D 2125/40; F16D 2200/0004; F16D 2250/0076
See application file for complete search history.

(56) References Cited

U.S. PATENT DOCUMENTS

| | | | | |
|---|---|---|---|---|
| 9,850,971 | B1 * | 12/2017 | Demorais | F16D 65/18 |
| 11,085,500 | B2 * | 8/2021 | Jubik | F16D 55/226 |
| 11,230,275 | B2 * | 1/2022 | Smith | B62D 5/046 |
| 2011/0315007 | A1 * | 12/2011 | Koch | F16J 1/001 92/172 |
| 2020/0158198 | A1 * | 5/2020 | Smith | B60T 1/065 |
| 2021/0095731 | A1 * | 4/2021 | Jubik | F16D 65/46 |
| 2022/0163076 | A1 * | 5/2022 | Fawcett | F16D 65/18 |
| 2022/0316539 | A1 * | 10/2022 | Smith | F16D 65/18 |
| 2023/0135838 | A1 * | 5/2023 | Baek | F16D 55/226 188/72.1 |
| 2024/0280152 | A1 * | 8/2024 | Hong | F16D 65/18 |

FOREIGN PATENT DOCUMENTS

| | | |
|---|---|---|
| KR | 10-2010-0090781 | 8/2010 |
| KR | 10-2021-0076991 | 6/2021 |
| KR | 10-2022-0026279 | 3/2022 |
| KR | 10-2022-0137540 | 10/2022 |

OTHER PUBLICATIONS

Korean Intellectual Property Office Application No. 10-2023-0080591, Office Action dated Jul. 1, 2026, 6 pages.

* cited by examiner

*Primary Examiner* — Thomas W Irvin
(74) *Attorney, Agent, or Firm* — WOMBLE BOND DICKINSON (US) LLP

(57) ABSTRACT

A brake piston includes a main body including a first metal material, and a footing including a second metal material that is different from the main body such that an external force generated by a spindle and a brake pad is not transferred to the main body, wherein the main body is coupled to the footing by rotary friction welding.

18 Claims, 6 Drawing Sheets

BRAKE PISTON AND MANUFACTURING METHOD THEREOF

CROSS-REFERENCE TO RELATED APPLICATION

Pursuant to 35 U.S.C. § 119(a), this application claims the benefit of earlier filing date and right of priority to Korean Patent Application No. 10-2023-0080591, filed on Jun. 22, 2023, the contents of which are hereby incorporated by reference herein in its entirety.

BACKGROUND

1. Field

The disclosure relates to a brake piston and a manufacturing method thereof, and more particularly, to a piston for caliper brake for implementing weight lightening and improving airtightness and a manufacturing method thereof.

2. Description of the Related Art

Brake systems for brake are essential to vehicles, and various types of brake systems are proposed for the safety of drivers and passengers.

A caliper brake is one of such brake systems and uses, as a braking force, a friction force generated by causing the brake pads to contact the discs rotating together with the wheels of the vehicle.

Existing caliper brakes have supplied, when a driver steps on the brake pedal to generate a braking force of the vehicle, hydraulic pressure for brake to the wheel cylinder through a booster mechanically connected to the brake pedal.

However, latest caliper brakes are electric caliper brakes and operate transmission devices such as motors by receiving drivers' intentions to brake as electrical signals.

The electric caliper brake generally includes a spindle unit for receiving a rotational force from the motor and converting a rotary motion into a linear motion. The spindle unit presses the piston and the piston causes the brake pads to contact the disc, thereby performing the parking function of the brake. The piston is made of a metal material having high durability because the piston is in direct contact with the spindle unit made of a material having a high hardness.

However, the piston made of a heavy-weight metal material excessively increases the weight of the caliper brake, which results in a fuel efficiency decrease of the vehicle. To avoid the problem, a dual piston including a component made of a light-weight material and a component made of a heavy-weight material, instead of an integrated piston, has been developed. However, the dual piston has caused a problem of airtightness.

Accordingly, to solve these problems, the present disclosure proposes a brake piston capable of implementing weight lightening and achieving high airtightness and a manufacturing method thereof.

SUMMARY

It is an embodiment of the disclosure to provide a light-weight brake piston and a manufacturing method thereof.

It is an embodiment of the disclosure to provide a light-weight brake piston for reinforcing rigidity and a manufacturing method thereof.

It is an embodiment of the disclosure to provide a brake piston for reducing an amount of fluid required for braking of a brake and a manufacturing method thereof.

It is an embodiment of the disclosure to provide a brake piston with improved airtightness and a manufacturing method thereof.

It is an embodiment of the disclosure to provide a brake piston for improving efficiency of a manufacturing process and a manufacturing method thereof.

Additional aspects of the disclosure will be set forth in part in the description which follows and, in part, will be obvious from the description, or may be learned by practice of the disclosure.

In accordance with an aspect of the disclosure, a brake piston may include: a main body including a first metal material; and a footing including a second metal material that is different from the main body such that an external force generated by a spindle and a brake pad is not transferred to the main body, wherein the main body may be coupled to the footing by rotary friction welding.

The first metal material may be lighter than the second metal material.

The first metal material may be aluminum, and the second metal material may be iron.

An internal space of the main body may be cup-shaped at both sides such that both ends communicate with each other.

One end of the main body may be provided with a main body spindle entry portion in which the spindle is inserted, and another end of the main body may include a footing coupling portion to which the footing is coupled.

The footing may include a tapered portion of which a cross-sectional area decreases toward the spindle entry portion, and the footing coupling portion may include an inclined inner surface of which a cross sectional area decreases toward the spindle entry portion.

The footing may further include a footing step at an end of the tapered portion toward the spindle entry portion, and the footing coupling portion may further include a main body step at an end of the inner surface toward the spindle entry portion.

The footing may be provided with a footing spindle entry portion in which the spindle is inserted, at a side toward the spindle entry portion.

The footing spindle entry portion may further include a rotation preventing surface being an area of an inner circumferential surface of the footing spindle entry portion and having a shape corresponding to a shape in side direction of the spindle.

The footing spindle entry portion may further include a bottom surface having a shape corresponding to a shape in front direction of the spindle.

In accordance with another aspect of the disclosure, a method for manufacturing a brake piston may include: providing a main body made of a first metal material; providing a footing made of a second metal material that is different from the first metal material; and coupling the main body to the footing by rotary friction welding.

The coupling of the main body to the footing by the rotary friction welding may include: rotating any one of the main body and the footing; moving at least any one of the main body and the footing in a direction in which the footing is pressed to the main body; heating contact surfaces of the main body and the footing to a preset temperature or more through friction heat; and additionally pressing at least any one of the main body and the footing in the direction which the footing is pressed to the main body, while reducing a rotation speed of the main body or the footing.

The coupling of the main body to the footing by the rotary friction welding may further include cooling the main body and the footing in a state in which the footing is pressed to the main body.

The method may further include removing burrs formed by the rotary friction welding.

The coupling of the main body to the footing by the rotary friction welding may further include checking airtightness of the main body and the footing welded.

The additionally pressing of the at least any one of the main body and the footing in the direction which the footing is pressed to the main body while reducing the rotation speed of the main body or the footing may include sharply reducing the rotation speed of the main body or the footing.

The footing may include a tapered portion of which a cross-sectional area decreases, and the main body may include an inclined inner surface of which a cross sectional area decreases in a footing coupling portion to which the footing is coupled, wherein upon the moving of the at least any one of the main body and the footing in the direction in which the footing is pressed to the main body, the tapered portion may be pressed to the inner surface.

The footing may further include a footing step at an end of the tapered portion, and the footing coupling portion may include a main body step at an end of the inner surface, wherein upon the moving of the at least any one of the main body and the footing in the direction in which the footing is pressed to the main body, the footing step may be pressed to the main body step.

A cross-sectional diameter of the tapered portion may be greater than a cross-sectional diameter of the footing coupling portion on a same axis, and upon the moving of the at least any one of the main body and the footing in the direction in which the footing is pressed to the main body, the tapered portion may be pressed to the inner surface while pressing the inner surface outward.

The providing of the footing made of the second metal material that is different from the first metal material may include providing a footing spindle entry portion inside the footing, providing a rotation preventing surface at an area of an inner circumferential surface of the footing spindle entry portion, and providing a bottom surface having a shape corresponding to a shape in front direction of the spindle at the footing spindle entry portion.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
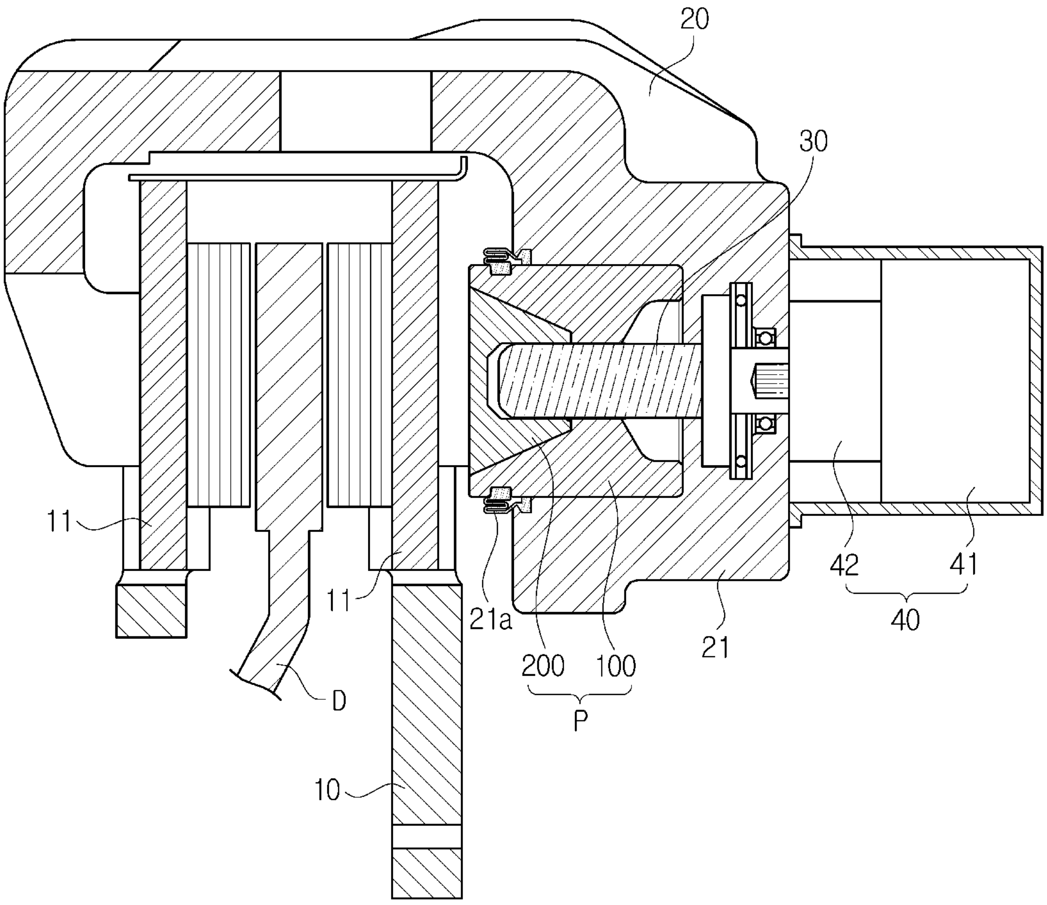
FIG. 1 is a cross-sectional view showing a caliper brake including a brake piston according to an embodiment of the disclosure.

Hereinafter, embodiments will be described in detail with reference to the accompanying drawings. The following embodiments are provided to transfer the technical concepts of the present disclosure to one of ordinary skill in the art. However, the present disclosure is not limited to these embodiments, and may be embodied in another form. In the drawings, parts that are irrelevant to the descriptions may be not shown in order to clarify the present disclosure, and also, for easy understanding, the sizes of components are more or less exaggeratedly shown.

FIG. 1 is a cross-sectional view showing a caliper brake including a brake piston P according to an embodiment of the disclosure.

Referring to FIG. 1, an electric caliper brake including the brake piston P according to an embodiment of the disclosure may include a disc D rotating together with a wheel of a vehicle, a carrier 10 in which a pair of brake pads 11 are installed to move back and forth to press the disc D, a caliper housing 20 slidably installed on the carrier 10, a cylinder 21 provided in the caliper housing 20, wherein the piston P is installed in the cylinder 21 to move back and forth by brake hydraulic pressure, a sealing member 21*a* for sealing between a main body 100 and the cylinder 21, a sealing member coupling groove 130 formed in an outer circumference surface of the main body 100 to accommodate the sealing member 21*a*, a spindle that moves linearly according to a rotation of a spindle nut (not shown) to press the piston P, and an actuator 40 configured with a motor 41 and a reducer 42 to transfer a rotational force to the spindle nut (not shown).

The spindle may be screwed to the spindle nut (not shown) to have limitation in rotating within the piston P. Accordingly, the spindle may move linearly according to a rotation of the spindle nut (not shown).

Figure 2:
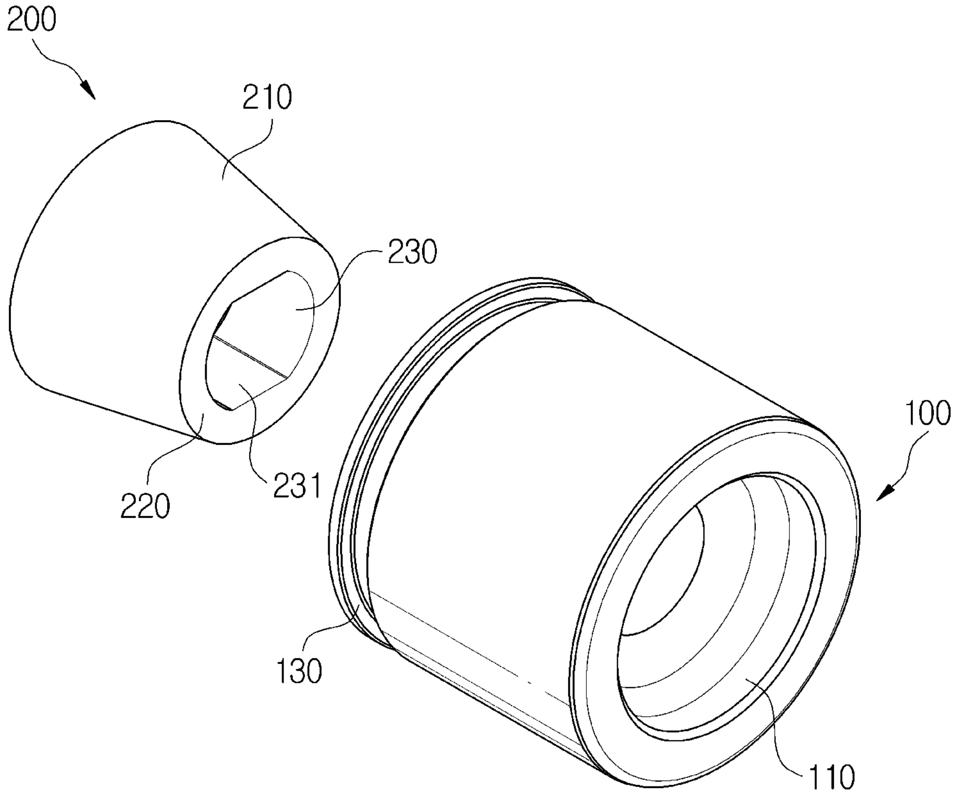
FIG. 2 is a perspective view showing a disassembled state of a brake piston according to an embodiment of the disclosure in a front direction.
Figure 3:
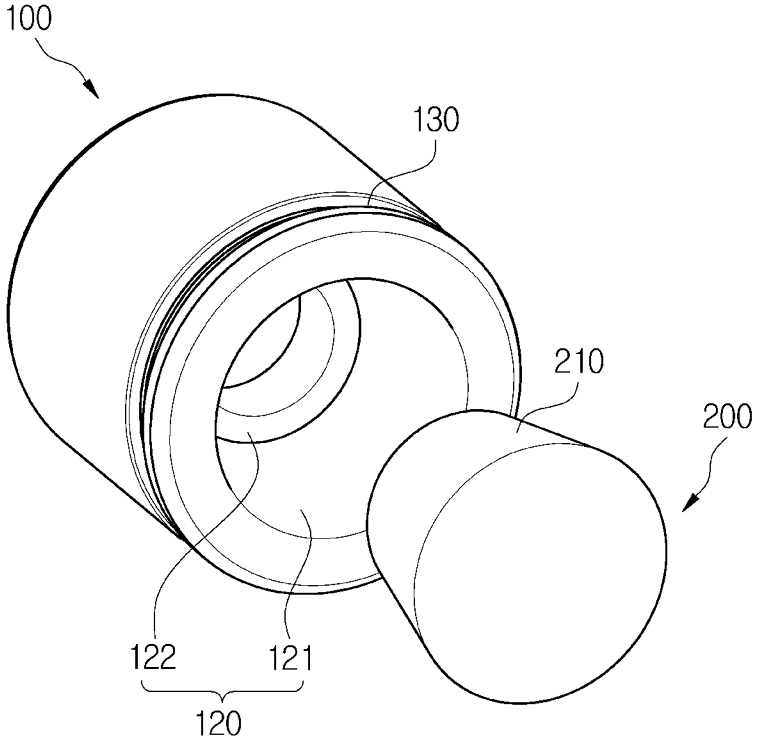
FIG. 3 is a perspective view showing a disassembled state of a brake piston according to an embodiment of the disclosure in a rear direction.

FIG. 2 is a perspective view showing a disassembled state of a brake piston according to an embodiment of the disclosure in a front direction, and FIG. 3 is a perspective view showing a disassembled state of a brake piston according to an embodiment of the disclosure in a rear direction.

Referring to FIGS. 1 to 3, the brake piston P according to an embodiment of the disclosure may include the main body 100 and a footing 200 including different metal materials.

Generally, an electric caliper brake may include a spindle unit made of a high hardness material. The piston P may be made of a metal material to have a certain level of rigidity or more because the piston P is pressed by the spindle unit.

However, in the case in which the piston P made of a metal material exceeds a certain size, the piston P may have a heavy weight, which causes a decrease in fuel efficiency and an increase in cost of the vehicle.

To solve this problem, the piston P according to an embodiment of the disclosure may be dualized into the main body 100 and the footing 200. More specifically, the main body 100 forming an outer appearance of the piston P may be made of a light metal material to have a large volume and a light weight, and the footing 200 being in direct contact with the spindle may be made of a material having high rigidity to reinforce rigidity of the main body 100.

The main body 100 may be in a shape of a cylinder and have an internal space. The internal space of the main body 100 may be cup-shaped at both sides such that both ends communicate with each other. More specifically, one end of the main body 100 may be provided with a main body spindle entry portion 110 in which the spindle is inserted, and another end of the main body 100 may include a footing coupling portion 120 to which the footing 200 is coupled.

An inner circumferential surface of the main body spindle entry portion 110 may be inclined to minimize an increase in internal volume of the main body 100 and improve flowability of fluid flowing into the main body 100.

The footing 200 may be coupled to the footing coupling portion 120, wherein one side of the footing 200 may be in contact with the brake pads 11 and another side of the footing 200 may be in contact with the spindle. Accordingly, an external force generated by the spindle and the brake pads 11 may be not directly transferred to the main body 100 due to the footing 200.

The main body 100 may include a first metal material and the footing 200 may include a second metal material. In this case, the first metal material may be lighter than the second metal material. For example, the first metal material may be aluminum and the second metal material may be iron. However, the first metal material and the second metal material of the present disclosure are not limited to these and include all metal materials made of different materials. The first metal material and the second metal material of the present disclosure may be selected depending on a type and design purpose of the caliper brake.

The footing 200 may include a tapered portion 210 of which a cross-sectional area decreases toward the spindle entry portion, at a side surface. The footing 200 may include a footing step 220 provided at an end of the tapered portion 210 toward the spindle entry portion and formed on a surface facing the spindle entry portion. A cross-sectional diameter of the tapered portion 210 may be greater than a cross-sectional diameter of the footing coupling portion 120 on the same axis. Accordingly, when the footing 200 is pressed toward the main body 100, the volume of the footing 200 or the main body 100 may change, and the footing 200 may be inserted into the main body 100, thereby improving airtightness between the footing 200 and the main body 100.

The footing coupling portion 120 may include an inclined inner surface 121 of which a cross sectional area decreases toward the spindle entry portion. The inner surface 121 may have a shape corresponding to the tapered portion 210. The footing coupling portion 120 may further include a main body step 122 provided at an end of the inner surface 121 toward the spindle entry portion and formed on a surface facing the footing 200.

The footing 200 may include a footing spindle entry portion 230 that is cup-shaped at a side toward the spindle entry portion. Accordingly, the spindle may be inserted into the footing spindle entry portion 230 by penetrating the main body 100.

Figure 4:
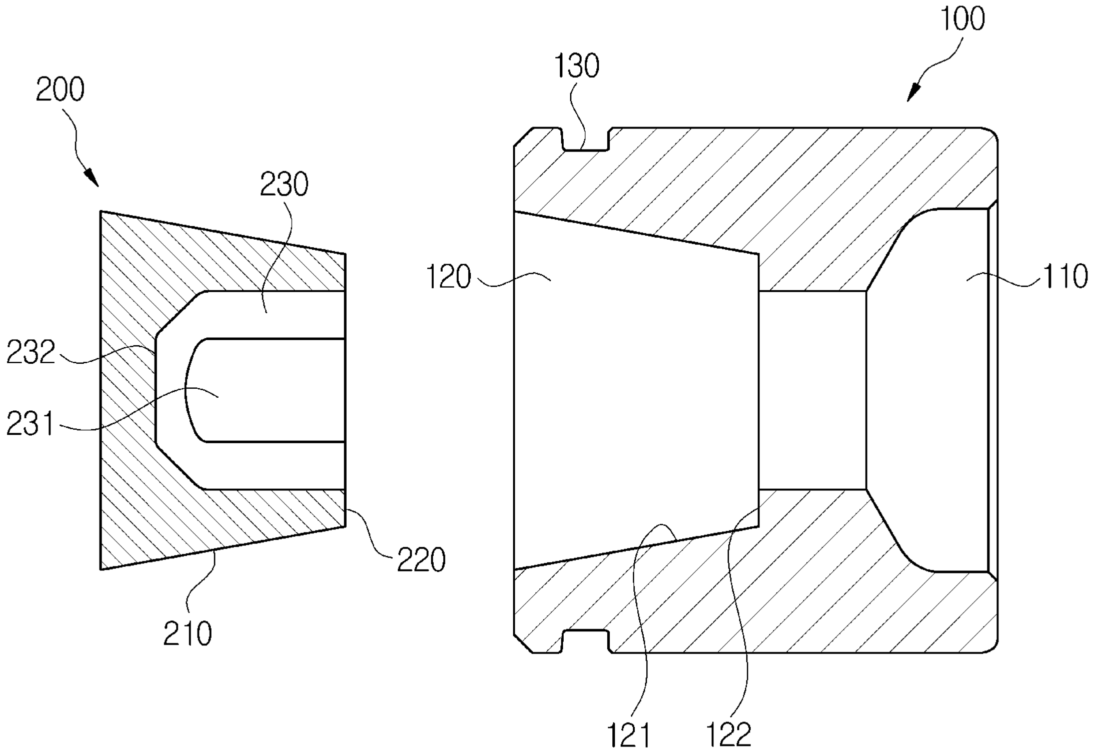
FIG. 4 is a cross-sectional view showing a disassembled state of a brake piston according to an embodiment of the disclosure from above.
Figure 5:
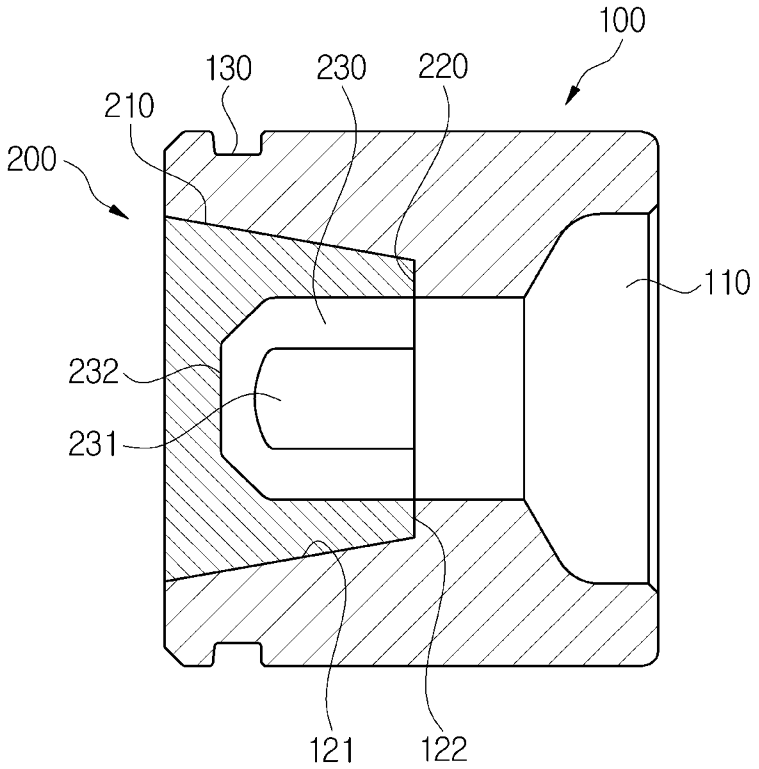
FIG. 5 is a cross-sectional view showing an assembled state of a brake piston according to an embodiment of the disclosure from above.

FIG. 4 is a cross-sectional view showing a disassembled state of a brake piston according to an embodiment of the disclosure from above, and FIG. 5 is a cross-sectional view showing an assembled state of a brake piston according to an embodiment of the disclosure from above.

Referring to FIGS. 2, 4, and 5, the footing spindle entry portion 230 according to an embodiment of the disclosure may include a rotation preventing surface 231 and a bottom surface 232.

The rotation preventing surface 231 may be positioned at an area of the inner circumferential surface of the footing spindle entry portion 230 and have a shape corresponding to a shape in side direction of the spindle.

The bottom surface 232 may be positioned at a deepest area of an inner surface of the footing spindle entry portion 230 and have a shape corresponding to a shape in front direction of the spindle.

The expression "inner circumferential surface of the footing spindle entry portion 230" may mean an inner side surface of the footing spindle entry portion 230, as shown in FIG. 2. Also, the expression "side direction of the spindle" may mean a side surface direction, and the expression "front direction of the spindle" may mean a direction in which a head of the spindle is directed.

According to an embodiment of the disclosure, the rotation preventing surface 231 may be provided at a lower area of the inner circumferential surface of the footing spindle entry portion 230, and a corner of the bottom surface 232 may include an inclined surface. Accordingly, the spindle may be prevented from rotating and guided to move linearly by the rotation preventing surface 231 and the bottom surface 232. However, the rotation preventing surface 231 and the inner circumferential surface according to the disclosure are not limited to these, include all shapes that prevent a rotation of the spindle and guide a linear motion of the spindle, and may be selected depending on a type of the spindle.

Hereinafter, a method for manufacturing the brake piston P according to the disclosure will be described.

Figure 6:
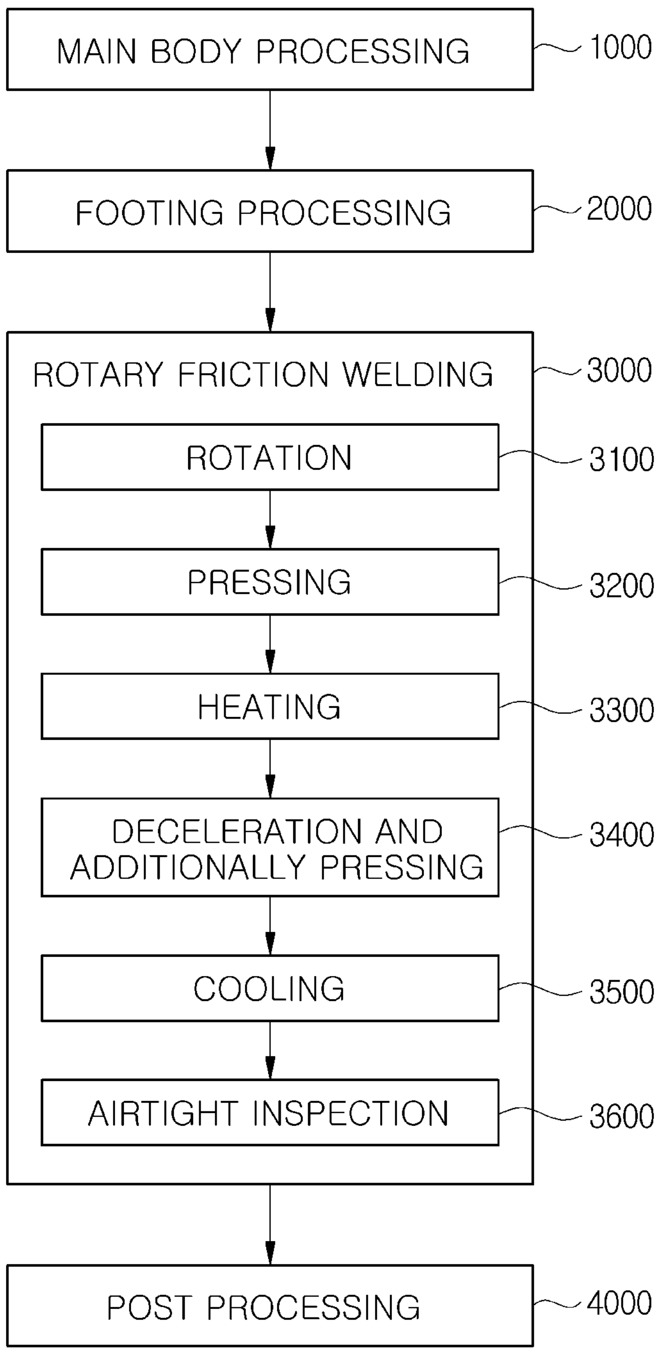
FIG. 6 is a flowchart showing a method for manufacturing a brake piston according to an embodiment of the disclosure.

FIG. 6 is a flowchart showing a method for manufacturing the brake piston P according to an embodiment of the disclosure.

Referring to FIG. 6, the method for manufacturing the brake piston P according to an embodiment of the disclosure may include main body processing operation 1000, footing processing operation 2000, rotary friction welding operation 3000, and post processing operation 4000.

The piston P dualized into the main body 100 and the footing 200, not formed as one piece, may have a problem of airtightness between components. Particularly, a typical method of structurally coupling the main body 100 to the footing 200 has had limitation in preventing leakage of brake fluid.

The piston P according to an embodiment of the disclosure may improve airtightness between components by coupling the main body 100 to the footing 200 through rotary friction welding 3000.

The main body processing operation 1000 may provide the main body 100 including the first metal material. The first metal material may be a relatively light metal such as, for example, aluminum. The main body 100 may include the main body spindle entry portion 110 and the footing coupling portion 120, and the footing coupling portion 120 may include the inner surface 121 and the main body step 122.

The footing processing operation 2000 may provide the footing 200 including the second metal material that is different from the first metal material. The second metal material may be a relatively heavy metal such as, for example, iron. The footing 200 may include the tapered portion 210 and the footing step 220 at the outer surface and include the footing spindle entry portion 230 including the rotation preventing surface 231 and the bottom surface 232 therein.

The footing processing operation 2000 may be performed after the main body processing operation 1000, before the main body processing operation 1000, or simultaneously with the main body processing operation 1000.

The rotary friction welding operation 3000 may couple the main body 100 to the footing 200 by rotary friction welding. More specifically, the rotary friction welding operation 3000 may include rotation operation 3100, pressing operation 3200, heating operation 3300, deceleration and additionally pressing operation 3400, cooling operation 3500, and airtight inspection operation 3600.

The rotation operation 3100 may rotate any one of the main body 100 and the footing 200. At this time, a component that rotates may be installed on a clamp of a rotating device, a component that does not rotate may be installed on a clamp of a fixing device, and then the rotating device may rotate at preset speed.

The pressing operation 3200 may move at least any one of the main body 100 and the footing 200 in a direction in which the footing 200 is pressed to the main body 100. For example, the component that does not rotate among the main body 100 and the footing 200 may move toward the component that rotates. However, the component that rotates may move or both the component that rotates and the component that does not rotate may move.

More specifically, the footing 200 may move into the footing coupling portion 120 of the main body 100, and thus, the tapered portion 210 of the footing 200 may be pressed to the inner surface 121 of the main body 100. Then, the footing 200 may continue to move toward the main body 100, and thus, the footing step 220 of the footing 200 may be pressed to the main body step 122 of the main body 100. The cross-sectional area of the tapered portion 210 may be greater than the cross-sectional area of the footing coupling portion 120 on the same axis. Accordingly, the tapered portion 210 may be pressed to the inner surface 121 while pressing the inner surface 121 outward, and the footing 200 may be pressed into the main body 100 by changing the volume.

The heating operation 3300 may heat contact surfaces of the main body 100 and the footing 200 to a certain temperature or more through friction heat generated while the main body 100 contacts the footing 200. Accordingly, the contact surfaces of the main body 100 and the footing 200 may be melted by the friction heat. At this time, the friction heat generated in the contact surfaces of the main body 100 and the footing 200 may increase until reaching a preset temperature. For example, the temperature may be set to a temperature that is higher than or equal to melting points of the first metal material of the main body 100 and the second metal material of the footing 200.

The deceleration and additionally pressing operation 3400 may additionally press at least any one of the main body 100 and the footing 200 in a direction which the footing 200 is pressed to the main body 100, while reducing a rotation speed of the main body 100 or the footing 200. At this time, the rotation speed of the main body 100 or the footing 200 may be reduced sharply and thus, the main body 100 or the footing 200 may stop. Accordingly, the main body 100 may be maintained in close contact with the footing 200 to prevent interference of air, resulting in an improvement of stability and quality of the welded structure.

The cooling operation 3500 may cool the main body 100 and the footing 200 heated in a state in which the footing 200 is pressed to the main body 100. At this time, the main body 100 and the footing 200 may be cooled over a sufficient cooling time, or the main body 100 and the footing 200 may be cooled rapidly through a cooler. Accordingly, the main body 100 and the footing 200 may be prevented from being deformed by thermal stress.

The airtight inspection operation 3600 may check airtightness of the main body 100 and the footing 200 welded. The airtight inspection operation 3600 may include various methods. For example, the airtight inspection operation 3600 may include visual inspection of inspecting a welded portion with the naked eye, pressure inspection of checking a pressure change after applying pressure with a liquid or gas, liquid penetrant inspection of checking leakage by using a liquid of a colored dye or a fluorescent material, and ultrasonic inspection of detecting a fault by using high frequency sound waves.

The post processing operation 4000 may be a task that is additionally performed after the rotary friction welding operation 3000 to improve the quality of the piston P. The post processing operation 4000 may include removing burrs formed on the contact surfaces of the main body 100 and the footing 200 by the rotary friction welding operation 3000.

As such, the brake piston P according to an embodiment of the disclosure may improve durability by including the main body 100 and the footing 200 including different metal materials, implement weight lightening, and minimize an amount of fluid required for braking of the brake by increasing the internal volume. Also, the main body 100 and the footing 200 constituting the brake piston P may be rapidly and completely coupled to each other through the rotary friction welding operation 3000, and airtightness of the brake piston P may be improved. Therefore, productivity of the brake piston P may be improved, and marketability of the vehicle may be improved.

The embodiment may provide a lightweight brake piston and a manufacturing method thereof.

The embodiment may provide a lightweight brake piston for reinforcing rigidity and a manufacturing method thereof.

The embodiment may provide a brake piston for reducing an amount of fluid required for braking of the brake and a manufacturing method thereof.

The embodiment may provide a brake piston with improved airtightness and a manufacturing method thereof.

The embodiment may provide a brake piston for improving efficiency of a manufacturing process and a manufacturing method thereof.

So far, although the disclosure has been described by the limited embodiments and drawings, the disclosure is not limited to these, and various corrections and modifications can be made by one of ordinary skill in the technical art to which the disclosure belongs within the technical concepts of the disclosure and equivalents of the appended claims.

What is claimed is:

1. A brake piston comprising:

a main body including a first metal material; and a footing including a second metal material that is different from the main body such that an external force generated by a spindle and a brake pad is not transferred to the main body, wherein the main body is coupled to the footing by rotary friction welding, wherein one end of the main body includes a footing coupling portion to which the footing is coupled, wherein the footing includes a tapered portion of which a cross-sectional area decreases toward a main body spindle entry portion, and wherein the footing coupling portion includes an inclined inner surface of which a cross-sectional area decreases toward the main body spindle entry portion.

2. The brake piston of claim 1, wherein the first metal material is lighter than the second metal material.

3. The brake piston of claim 2, wherein the first metal material is aluminum and the second metal material is iron.

4. The brake piston of claim 1, wherein an internal space of the main body is cup-shaped at both sides such that both ends communicate with each other.

5. The brake piston of claim 4, wherein another end of the main body is provided with the main body spindle entry portion in which the spindle is inserted.

6. The brake piston of claim 5, wherein the footing further includes a footing step at an end of the tapered portion toward the main body spindle entry portion, and the footing coupling portion further includes a main body step at an end of the inclined inner surface toward the main body spindle entry portion.

7. The brake piston of claim 5, wherein the footing is provided with a footing spindle entry portion in which the spindle is inserted, at a side toward the spindle entry portion.

8. The brake piston of claim 7, wherein the footing spindle entry portion further includes a rotation preventing surface being an area of an inner circumferential surface of the footing spindle entry portion and having a shape corresponding to a shape in side direction of the spindle.

9. The brake piston of claim 7, wherein the footing spindle entry portion further includes a bottom surface having a shape corresponding to a shape in front direction of the spindle.

10. A method for manufacturing a brake piston, comprising:

providing a main body made of a first metal material;

providing a footing made of a second metal material that is different from the first metal material such that an external force generated by a spindle and a brake pad is not transferred to the main body; and coupling the main body to the footing by rotary friction welding, wherein the coupling of the main body to the footing by the rotary friction welding comprises:

rotating any one of the main body and the footing; and moving at least any one of the main body and the footing in a direction in which the footing is pressed to the main body, wherein the footing includes a tapered portion of which a cross-sectional area decreases, and the main body includes an inclined inner surface of which a cross sectional area decreases in a footing coupling portion to which the footing is coupled, and wherein upon the moving of the at least any one of the main body and the footing in the direction in which the footing is pressed to the main body, the tapered portion is pressed to the inclined inner surface.

11. The method of claim 10, wherein the coupling of the main body to the footing by the rotary friction welding further comprises:

heating contact surfaces of the main body and the footing to a preset temperature or more through friction heat; and additionally pressing at least any one of the main body and the footing in the direction which the footing is pressed to the main body, while reducing a rotation speed of the main body or the footing.

12. The method of claim 11, wherein the coupling of the main body to the footing by the rotary friction welding further comprises cooling the main body and the footing in a state in which the footing is pressed to the main body.

13. The method of claim 11, wherein the coupling of the main body to the footing by the rotary friction welding further comprises checking airtightness of the main body and the footing welded.

14. The method of claim 11, wherein the additionally pressing of the at least any one of the main body and the footing in the direction which the footing is pressed to the main body while reducing the rotation speed of the main body or the footing comprises sharply reducing the rotation speed of the main body or the footing.

15. The method of claim 11, wherein the footing further includes a footing step at an end of the tapered portion, and the footing coupling portion includes a main body step at an end of the inclined inner surface, wherein upon the moving of the at least any one of the main body and the footing in the direction in which the footing is pressed to the main body, the footing step is pressed to the main body step.

16. The method of claim 11, wherein a cross-sectional diameter of the tapered portion is greater than a cross-sectional diameter of the footing coupling portion on a same axis, and upon the moving of the at least any one of the main body and the footing in the direction in which the footing is pressed to the main body, the tapered portion is pressed to the inclined inner surface while pressing the inclined inner surface outward.

17. The method of claim 10, further comprising removing burrs formed by the rotary friction welding.

18. The method of claim 10, wherein the providing of the footing made of the second metal material that is different from the first metal material comprises providing a footing spindle entry portion inside the footing, providing a rotation preventing surface at an area of an inner circumferential surface of the footing spindle entry portion, and providing a bottom surface having a shape corresponding to a shape in front direction of the spindle at the footing spindle entry portion.

* * * * *